United States Patent Office 3,476,520
Patented Nov. 4, 1969

3,476,520
CHEMICAL ADDITION OF GAS TO LIQUID SOLVENT APPARATUS
Daniel T. Hovey, Hillcrest, Niagara Falls, N.Y. 14303
Filed Sept. 19, 1966, Ser. No. 580,456
Int. Cl. B01j 7/02
U.S. Cl. 23—282                                    8 Claims

ABSTRACT OF THE DISCLOSURE

Apparatus capable of carbonizing water. A pair of members each preferably cylindrical and each closed at one end are threaded together to comprise a housing which is apertured over a minor portion of its surface. The housing is supported within a vessel containing a solvent, such as water, by means of a rod and stopper for the vessel. A filter bag, containing the chemicals for reaction, is disposed within the housing and the filter bag is previous to the gas and solvent but impervious to solid reactants and by-products from the chemical reaction, such that pure carbonization is obtained.

---

Figures 1, 2:
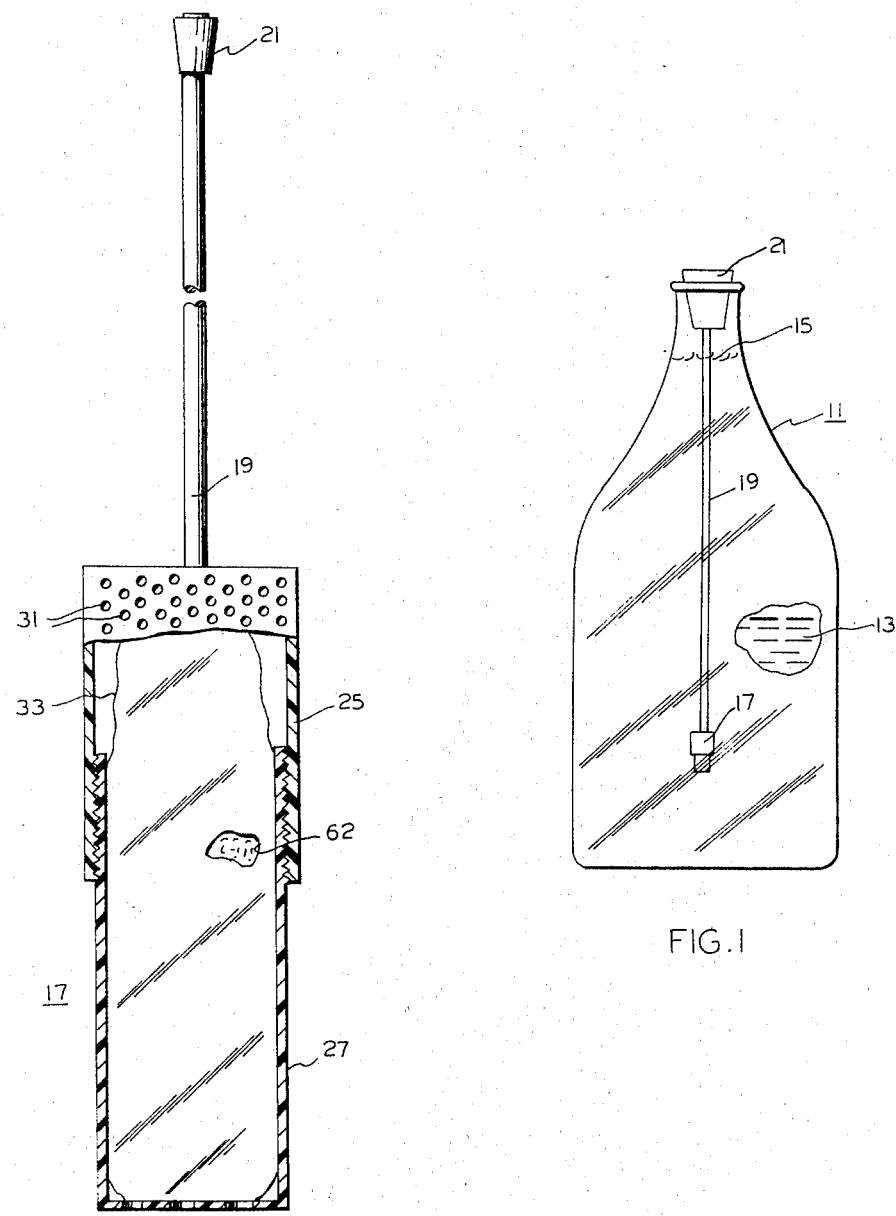

The present invention relates to a novel apparatus for chemically adding a gas to a liquid solvent, while substantially precluding the solid by-products of the chemical reaction from entering the solution.

The apparatus of this invention will be explained in particular with respect to the production of flavored and non-flavored carbonated beverages by the individual. This may be accomplished at home, using plain tap water for quickly producing carbonated beverages which may be then consumed or stored for later use. Since water is not usually added until the beverage is to be consumed, the storage problem related to prebottled carbonated beverages is obviated. In addition, the bottles need not be returned, sterilized, refilled and redelivered.

The equipment essential to the invention is quite compact and relatively simple, and thus, carbonated beverages can be made conveniently where there is available water.

A feature of the invention enables the production of the product without substantial contamination by any of the solid byproducts of the reaction, affording acceptably true flavor.

Basically, the invention provides for the reaction of two solid chemicals to produce carbon dioxide beneath the surface of water to be carbonated. A container and filtration system are employed which permit water to enter the container to bring about the reaction, and at the same time, substantially prevent the solid by-products from escaping into the solution.

The container is in the form of a two-section cartridge or housing. A supporting rod may be affixed to or integral with the housing and include the stopper for the bottle. The housing is preferably cylindrical and the cylinder comprises two cylindrical portions, each closed at one end and each threaded at the other end so they can be screwed together. The cylinder is penetrated with a great number of small holes, such that a minor percent of its surface has been apertured or drilled away.

A filter bag containing chemicals substantially fills the interior of the cylinder. The filter bag is permeable to the solvent but not the solid by-products.

When the apparatus is placed in a predetermined amount of liquid solvent, within a vessel closed by the stopper, the solvent, such as water, penetrates the bag and brings about the desired reaction, such as the production of $CO_2$, as well as the resultant by-products of the chemical reaction.

While a small trace of the reactants and the by-products escape into the solvent, nevertheless it has been found that the amount is so small that it neither imparts taste nor color to the solvent.

Suitable chemicals are calcium carbonate and fumaric acid in the stoichiometric relationship, since the reactants and by-products are quite insoluble, and only a minor quantity of the chemicals contained escape through the filter paper and even in higher concentration cannot be detected by taste or color. In addition, calcium carbonate can be used with tartaric acid or malic acid. In this case since both acids are slightly soluble, it is necessary to have an excess of carbonate to limit the amount of escaping acid. But there again there is insufficient contamination to detect it by taste or color change.

A predetermined amount of water is employed with a predetermined amount of chemicals and the reaction is timed to produce the desired degree of carbonation. The chemical cartridge is simply removed and the contents consumed or the bottle is restoppered for later use.

With the foregoing in mind it is an object of the invention to provide apparatus to permit the chemical addition of gas to liquid solvent.

Another object is the provision of such apparatus enabling high speed reaction of the chemicals contained therein and minimum displacement of the solvent by the apparatus.

Another object is the provision of apparatus for the addition of gas to a liquid by chemical means while precluding the solid by-products of the chemical reaction from entering the solution.

More particularly, it is an object of the invention to provide for the production of carbonated water or flavored carbonated beverages at low cost.

With the foregoing in mind, other and further objects will be appreciated from a reading of detailed description to follow, in conjunction with the drawings wherein:

FIG. 1 is an elevational view showing the apparatus in operative position within a bottle, and FIG. 2 is a view partly in side elevation and partly in cross-section showing the apparatus per se, of the subject invention.

In FIG. 1 there is depicted a bottle 11 filled with fluid 13 to a level 15. Cartridge 17 is supported by rod 19 connected to stopper 21.

The cartridge 17 is preferably comprised of cylindrical halves or sections 25 and 27.

Male section 27 is threadably received by female section 25, in order that the filter bag 33 may readily be replaced. The preferred material for bag 33 is conventional filter paper, such as Whatman filter paper type No. 1 or 2, and the preferred material for cartridge 17 and rod 19 is stainless steel.

The cylinder 17 is perforated by small holes 31 which may be drilled or otherwise formed. The extent of perforation should comprise, of the order of 30 percent of the surface which it has been found permits high speed reaction yet maintains the cylinder 17 sufficiently rigid for its intended purpose.

Rod 19 is integral with, or otherwise affixed to, cylinder 25 and carries stopper 21. Stopper 21 snugly fits bottle 11 and maintains it closed against the pressure of carbonation during the process of developing carbon dioxide, in the preferred embodiment.

The filter bag 33 may contain a mixture of, for example, calcium carbonate and fumaric acid in their stoichiometric relationship. A typical amount of these reactions would be sufficient to produce in for example, 30 seconds, the requisite carbonation of the contents of a given size bottle, for example, one quart.

Water, of course, enters holes 31 and passes into the filter bag 33 to initiate the reaction, with the gas exiting through the filter paper and apertures 31 to produce the carbonation. It should be noted that the filter bag 33 must either be of extra heavy paper or else of substantially the same size as the interior of cylinder 17 or larger than this volume in order that undue pressure will not cause rupturing thereof. This is the reason that the holes 31 are of the order of ⅛ inch in diameter, again to prevent the bag from rupturing by being expanded through a hole.

Only a minute quantity of the chemicals involved escape through the filter paper as reactants and by-products, but these are in insufficient amounts to affect either the taste or color of the solvent.

When calcium carbonate is employed with tartaric acid or malic acid, it is necessary to have an excess of calcium carbonate so as to limit the amount of escaping acid because both of these acids are slightly soluble. But here again the amount escaping is insufficient to affect the taste or color of the solvent.

As other and further objects and embodiments of the invention will doubtless become apparent to those skilled in the art from a reading of the description herein presented, it is intended that the invention be limited only by the scope of the appended claims, wherein:

What is claimed is:

1. Apparatus adapted to contain chemicals for immersion in solvent contained in a vessel to effect a chemical reaction therewith comprising in combination, a pair of cylindrical members each closed at one end and each threaded adjacent to its opposite end for threadably engaging one with the other to comprise a housing; said housing being apertured over a minor portion of its surface; a filter bag disposed within the housing to contain and enclose the chemicals; being previous to the solvent and impervious to the chemicals; and rod and stopper means connected to the housing for suspending the same in the solvent and stoppering the vessel.

2. Chemical containing apparatus adapted to be immersed under a predetermined amount of solvent contained in a vessel to produce a gas producing chemical reaction with the solvent comprising in combination, openable cartridge means which comprises male and female cylindrical members respectively closed at one end and threaded at their opposite ends for mutual engagement; closed filtering means contained in said cartridge means; said filtering means comprising a filter bag having a volume at least substantially approaching that of the interior of the cartridge means and being adapted to contain chemicals for reaction with the solvent; said filtering means being pervious to said gas and said solvent to admit said solvent and pass said gas but substantially preclude the passage of any solid reactants and by-products from said chemical reaction; said cartridge means being apertured over a minor portion of the surface thereof for permitting solvent to enter the cartridge and penetrate the filtering means to initiate the reaction and enabling the resultant gas formed thereby to pass into the vessel.

3. The apparatus of claim 2 wherein the solvent is water and the chemicals for reaction comprise calcium carbonate and fumaric acid.

4. The apparatus of claim 3 wherein the calcium carbonate and fumaric acid are present in the filter bag in amounts relative to their stoichiometric relationship.

5. The apparatus of claim 2 wherein the solvent is water and the chemicals for reaction comprise calcium carbonate and tartaric acid.

6. The apparatus of claim 5 wherein the calcium carbonate and the tartaric acid are present in relative amounts to obtain a stoichiometric excess of carbonate.

7. The apparatus of claim 2 wherein the solvent is water and the chemicals for reaction comprise calcium carbonate and malic acid.

8. The apparatus of claim 7 wherein the calcium carbonate and the malic acid are present in relative amounts to obtain a stoichiometric excess of carbonate.

References Cited

UNITED STATES PATENTS

| | | | |
|---|---|---|---|
| 19,960 | 4/1858 | Avery et al. | 99—275 |
| 20,382 | 5/1858 | Wheeler | 23—282 XR |
| 65,500 | 6/1867 | Needham | 99—275 |
| 437,318 | 9/1890 | Thackeray | 99—275 |
| 705,570 | 7/1902 | Feldgamp | 23—282 |
| 1,539,284 | 5/1925 | Thebaud | 23—282 |
| 2,334,211 | 11/1943 | Miller | 23—282 |

FOREIGN PATENTS 4,194   3/1886   Great Britain.

MORRIS O. WOLK, Primary Examiner

BARRY S. RICHMAN, Assistant Examiner

U.S. Cl. X.R.

9—321; 23—150; 99—275; 261—122